(12) United States Patent
Mathur

(10) Patent No.: US 10,678,881 B2
(45) Date of Patent: Jun. 9, 2020

(54) USAGE-BASED PREDICTIVE PREFETCHING AND CACHING OF COMPONENT-BASED WEB PAGES FOR PERFORMANCE OPTIMIZATION

(71) Applicant: salesforce.com, inc., San Francisco, CA (US)

(72) Inventor: Ashraya Raj Mathur, Livermore, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/023,346

(22) Filed: Jun. 29, 2018

(65) Prior Publication Data

US 2020/0004889 A1 Jan. 2, 2020

(51) Int. Cl.
| | |
|---|---|
| *G06F 16/957* | (2019.01) |
| *H04L 29/08* | (2006.01) |
| *G06F 16/958* | (2019.01) |
| *H04L 29/06* | (2006.01) |

(52) U.S. Cl.
CPC ........ *G06F 16/9574* (2019.01); *G06F 16/986* (2019.01); *H04L 67/02* (2013.01); *H04L 67/2852* (2013.01); *H04L 67/42* (2013.01)

(58) Field of Classification Search
CPC .................................................. G06F 16/9574
See application file for complete search history.

(56) References Cited

U.S. PATENT DOCUMENTS

| | | | |
|---|---|---|---|
| 7,730,478 | B2 | 6/2010 | Weissman |
| 8,648,858 | B1 | 2/2014 | Swenson et al. |
| 9,277,432 | B2 | 3/2016 | Mathur et al. |
| 10,250,715 | B2 | 4/2019 | Mathur et al. |
| 10,250,716 | B2 | 4/2019 | Joshi et al. |
| 10,372,600 | B2 | 8/2019 | Mathur |
| 2007/0294371 | A1 | 12/2007 | Petri |
| 2009/0300496 | A1 | 12/2009 | Fan et al. |
| 2011/0178854 | A1 | 7/2011 | Sofer et al. |
| 2014/0280515 | A1* | 9/2014 | Wei .......................... H04L 67/02 709/203 |
| 2014/0282218 | A1 | 9/2014 | Kaufman et al. |
| 2015/0099493 | A1 | 4/2015 | Mathur et al. |

(Continued)

OTHER PUBLICATIONS

Non-Final Office Action from U.S. Appl. No. 15/971,923, dated Aug. 14, 2019, 18 pages.

(Continued)

*Primary Examiner* — Suraj M Joshi
(74) *Attorney, Agent, or Firm* — NDWE LLP

(57) ABSTRACT

A method is described for intelligently prefetching a web page of a web application for a user. The method includes loading, by a client device, a current web page of the web application in a web browser of the client device; determining a predicted web page based on the current web page and usage patterns of the user, wherein the predicted web page is a web page the user is predicted to navigate to from the current web page; prefetching, by the client device, metadata and content data describing the predicted web page from a web server prior to the user requesting the predicted web page; and caching, by the client device, the metadata and content data describing the predicted web page in a multi-level caching structure.

21 Claims, 9 Drawing Sheets

(56) References Cited

U.S. PATENT DOCUMENTS

| | | |
|---|---|---|
| 2015/0212814 A1 | 7/2015 | Fransen et al. |
| 2015/0371142 A1* | 12/2015 | Jain .................... G06F 16/9574 706/52 |
| 2015/0378575 A1 | 12/2015 | Kaplinger et al. |
| 2017/0310791 A1 | 10/2017 | Palse et al. |
| 2017/0337609 A1 | 11/2017 | Turemen et al. |
| 2018/0007165 A1 | 1/2018 | Mathur et al. |
| 2018/0007166 A1 | 1/2018 | Joshi et al. |
| 2018/0253373 A1 | 9/2018 | Mathur |
| 2018/0268307 A1 | 9/2018 | Kobayashi et al. |
| 2018/0275969 A1 | 9/2018 | Grigoryan et al. |
| 2019/0230192 A1 | 7/2019 | Mathur et al. |
| 2019/0235984 A1 | 8/2019 | Mathur et al. |
| 2019/0342405 A1 | 11/2019 | Mathur |

OTHER PUBLICATIONS

Final Office Action, U.S. Appl. No. 15/971,923, dated Feb. 13, 2020, 18 pages.

* cited by examiner

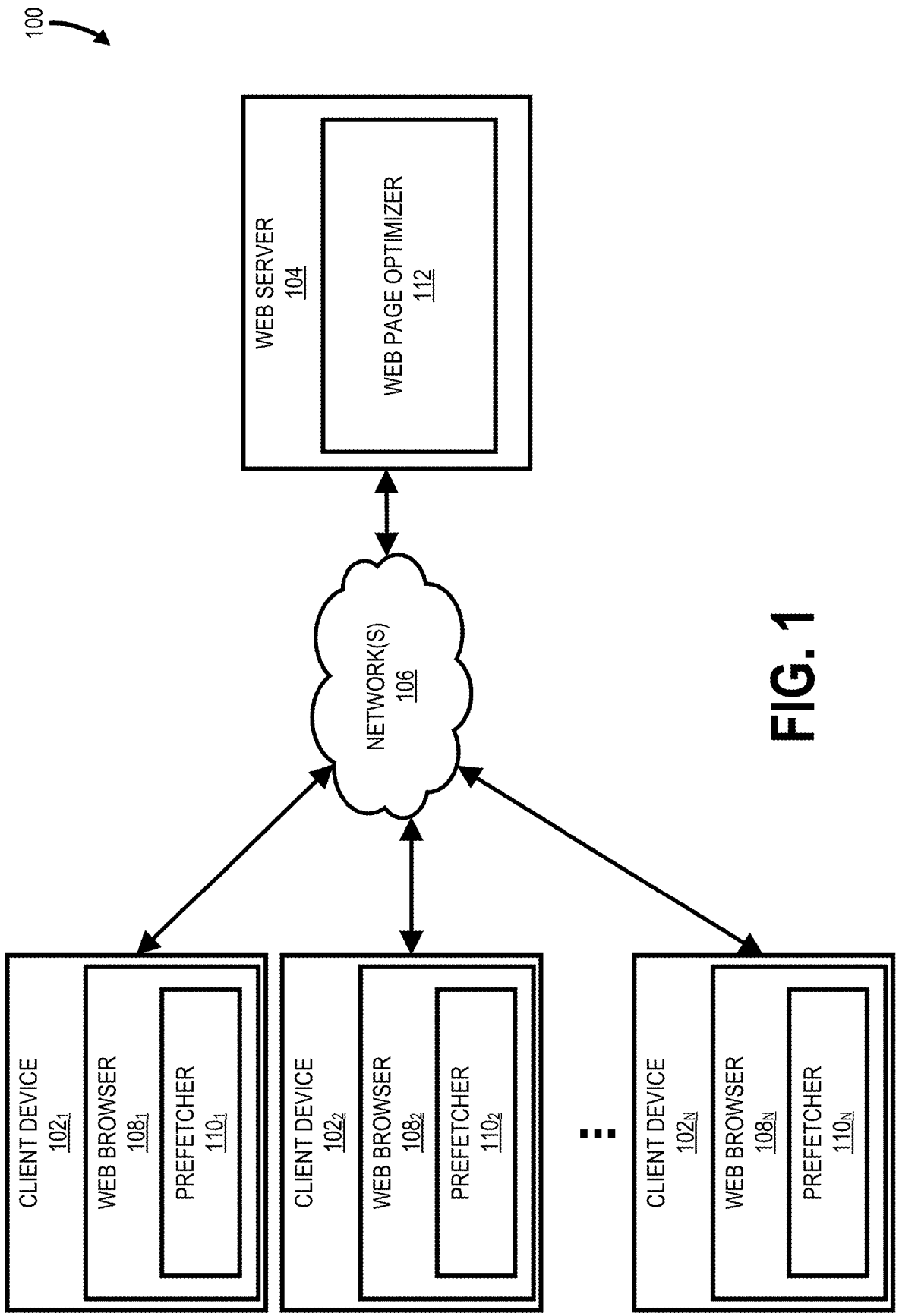

USAGE-BASED PREDICTIVE PREFETCHING AND CACHING OF COMPONENT-BASED WEB PAGES FOR PERFORMANCE OPTIMIZATION

TECHNICAL FIELD

One or more implementations relate to the field of web page management in a component-driven, multi-tenant cloud application; and more specifically, to predictive prefetching and caching of component-based web pages based on user usage patterns and/or performance metrics.

BACKGROUND

A cloud-based application may be defined by one or more web pages and each web page may be composed of multiple components. Each component in a web page may include multiple user interface elements (e.g., texts boxes, buttons, labels, etc.) and may request information from a web server using server actions/requests. For example, a first web page may include a news feed component, which lists links and/or headlines of news articles; a weather component, which displays weather conditions at a location; and an email preview component, which displays a brief synopsis of email messages received at an email account (e.g., subject line, time received, etc.). Once loaded in a web browser on a client device of a user, the news feed component may request relevant news articles from a web server, the weather component may request weather information at the location from the web server, and the email preview component may request email message information from the web server. The requests corresponding to each component may be combined into a single request that is transmitted to the web server (i.e., a batch request). In response, the web server may transmit data describing news articles to be presented to the user via the news feed component, weather information to be displayed to the user via the weather component, and email message information to be displayed to the user via the email preview component.

Although the user is currently viewing/interacting with the above described first web page, at some point the user may decide to navigate to a second web page. For example, the user may select/click a comment link associated with a news article in the news feed component, which causes the web browser to request the second web page. The second web page may include a social networking component that displays social networking messages and/or allows the user to transmit/post a new message. To display the second web page to the user, the web browser of the client device requests the second web page, including the social networking component, in response to selecting/clicking the comment link. The request for the second web page may be transferred to a web server via a set of networks and the web server may respond to the requests with information describing the second web page, including the social networking component and associated record/content data to be displayed/presented in the social networking component. Upon receipt of the information describing the second web page, including information describing the social networking component, the web browser of the client device may render the second web page (e.g., render/load one or more files representing the second web page based on the received information describing the second web page).

The above-described scenario for loading the second web page in response to the selection by the user may result in a poor user experience. In particular, the user is forced to wait for (1) the web browser to request the second web page after selection of the comment link, (2) the web server to fulfill the request via the set of networks, and (3) the web browser to render/load the second web page. This delay may be frustrating for the user, particularly in scenarios where the user is attempting to conduct a task commonly performed by the user (i.e., the user commonly navigates to the second web page to access the social networking component).

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 1 shows a block diagram illustrating a computing environment, including a web server, according to one example implementation.

DETAILED DESCRIPTION

Figure 2A:
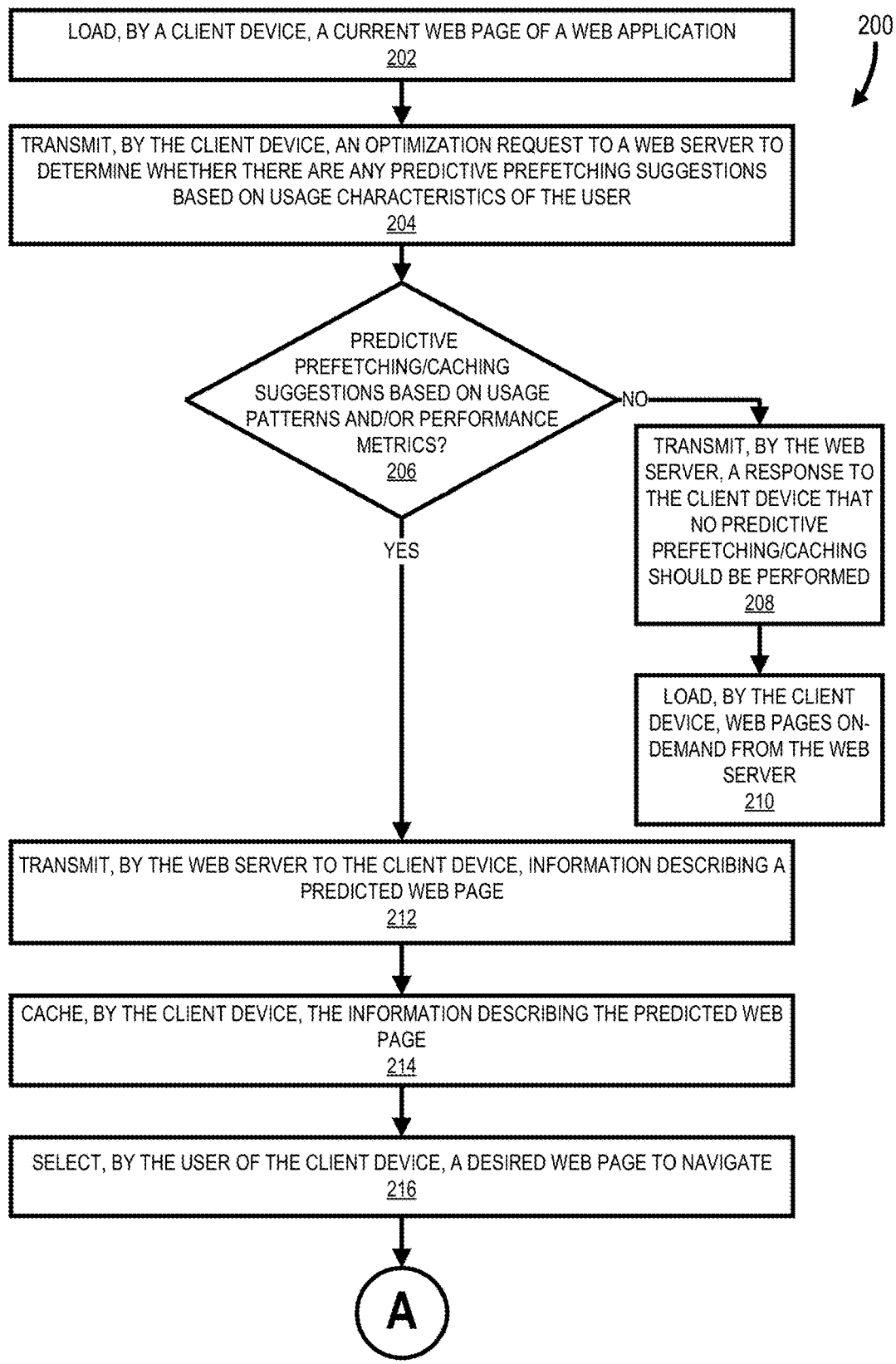
FIGS. 2A and 2B show a method for intelligently prefetching and caching data associated with web pages, according to one example implementation.

FIG. 1 is a block diagram illustrating a computing environment 100, according to one example implementation. The computing environment 100 includes client devices $102_1$-$102_N$ (where N≥2), a web server 104, and a set of networks 106. The computing environment 100 provides information to users operating the client devices $102_1$-$102_N$ via component-based web applications. In particular, the client devices $102_1$-$102_N$ present components in component-driven, cloud applications to users via one or more web pages. The components may include/present various pieces of information that are received from the web server 104 based on corresponding requests from client devices $102_1$-$102_N$. For example, a web page presented on the client device $102_1$ (e.g., in a web browser $108_1$ operating on the client device $102_1$) may include a news feed component, which lists links and/or headlines of news articles; a weather component, which displays weather conditions at a location; and an email preview component, which displays a brief synopsis of email messages received at an email account (e.g., subject line, time received, etc.).

In some cases, components may be added/loaded into the web page based on actions/selections by a user. For example, in response to selection of a "comment" button in an article presented in the news feed component, the web page may load a social networking component. The addition of this new component (e.g., the social networking component) may be considered a different web page from the web page that did not include the new component (i.e., the web page prior to loading the social networking component is different/separate from the web page after loading the social networking component). As will be described in greater detail below, the web server 104 and/or the client devices $102_1$-$102_N$ may intelligently prefetch web pages, including components, prior to selections/requests from the user. In particular, a web page optimizer 112 of the web server 104 may assist prefetchers $110_1$-$110_N$ of the web browsers $108_1$-$108_N$ of the client devices $102_1$-$102_N$ to intelligently prefetch component-based web pages (i.e., prefetch one or more of metadata and content data) based on (1) usage patterns of the users of the client devices $102_1$-$102_N$ in relation to web pages and/or (2) performance metrics associated with each web page (e.g., client device metrics describing the loading of web pages on a client device $102_1$-$102_N$, network metrics describing fulfillment of requests for web page over the network(s) 106, web server metrics describing generation/serving web pages by the web server 104, and caching metrics describing caching of metadata and/or content data of the web pages) to provide an improved user experience. Namely, the intelligent fetching and caching of metadata and/or content data may reduce the time between a user of a client device $102_1$-$102_N$ selecting/requesting a particular web page, which is comprised of a set of components, and the web page being fully loaded in a browser $108_1$-$108_N$ of the client device $102_1$-$102_N$.

For example, the web page optimizer 112 may indicate to the prefetcher $110_1$ that a particular web page (i.e., a predicted web page) is likely to be imminently requested by a user of the client device $102_1$ and as such should be prefetched and cached prior to the user's request. As noted above, the determination may be based on usage patterns of the user and/or performance metrics associated with web pages. Usage patterns may include one or more of historic click/selection interactions and click paths within web pages. For example, based on previous interactions with a current web page (i.e., the web page currently being displayed to a user in a browser $108_1$ of the client device $102_1$), the web page optimizer 112 may determine that eighty percent of the time when the user is viewing/interacting with the current web page, the user navigates to a particular web page (i.e., a predicted web page). In response to this determined behavior of the user, the web page optimizer 112 may transmit one or more of metadata (e.g., data describing the layout of a set of components presented in the predicted web page) and content data (e.g., records/content to be displayed in the set of components) to the prefetcher $110_1$ of the client device $102_1$. The prefetcher $110_1$ may work along with other components of the web browser $108_1$ to cache the metadata and content data as they arrive from the web server 104 and generate one or more files representing the predicted web page. Accordingly, upon request of the predicted web page by the user, processing time for presenting the predicted web page to the user may be reduced as the predicted web page may be at least partially received (e.g., some amount of the metadata and/or the content data may be received) and files representing the second web page may be already partially or fully generated (e.g., one or more Hypertext Markup Language (HTML) files may be partially or fully generated). As a result of this intelligent prefetching of a predicted web page, user experience may be improved when the prediction is correct (i.e., the user selects/requests the predicted web page and the predicted web page is displayed without the need to wait for requesting data/information from the web server 104 and processing by the web browser $108_1$) while not providing a negative impact when the prediction is incorrect (i.e., a selected web page, which is not the predicted web page, is fetched and loaded in a normal/non-predictive manner). As noted above, in some implementations, the determination of whether to prefetch and/or cache a predicted web page may additionally be based on performance metrics associated with web pages. In these implementations, metrics may be calculated for loading, transmitting, processing, and/or caching a predicted web page to determine the potential performance improvement as a result of intelligent fetching and caching of a predicted web page. When the improvement is significant (e.g., above a threshold value), prefetching and caching may be performed.

Each element of the computing environment 100 of FIG. 1 will now be described in greater detail below by way of example. In some implementations, the computing environment 100 may include more elements than those shown in FIG. 1. Accordingly, the computing environment 100 of FIG. 1 is purely for illustrative purposes.

As shown in FIG. 1 and described above, the client devices $102_1$-$102_N$ and the web server 104 may be connected through a set of one or more networks 106. The set of one or more networks 106 may be, for example, a local area network (LAN), a wide area network (WAN), a global area network (GAN), such as the Internet, or a combination of such networks. In another implementation, the client devices $102_1$-$102_N$ and the web server 104 may maintain a direct connection to each other via a wired or wireless medium.

Each of the client devices $102_1$-$102_N$ may be a computing system that may be operated by one or more users. For example, each of the client devices $102_1$-$102_N$ may be a personal computer (PC), a workstation, a laptop computer, a tablet computer, a mobile phone, a smartphone, a personal digital assistant (PDA), or the like. As will be described in greater detail below, the client devices $102_1$-$102_N$ may communicate with the web server 104 to access resources, such as one or more applications operating on or served by the web server 104. The applications may include or may be defined by a set of web pages that each includes a set of components (e.g., a news feed component, a social networking component, a weather component, etc.) and each component may include one or more display elements (e.g., list boxes, text fields, dropdown buttons, radio buttons, etc.). As used herein, each web page may be defined by a unique set of components and records. Accordingly, altering the set of components and/or records displayed/presented/included in a web page results in a different web page.

The client devices $102_1$-$102_N$ may each include a screen/display (e.g., a liquid crystal (LCD) display) for presenting web pages, including each component of the web pages, to the user via a web browser $108_1$-$108_N$. As will be described in greater detail below, each web browser $108_1$-$108_N$ may include a prefetcher $110_1$-$110_N$ for prefetching and caching predicted web pages based on usage patterns of a user in relation to the current web page and/or performance metrics regarding the fetching, caching, and/or loading of web pages.

The client devices $102_1$-$102_N$ may each be associated with one or more organizations/tenants. For example, users of the client devices $102_1$ and $102_2$ may be customers of a first organization/tenant and a user of the client device $102_N$ may be a customer of a second organization/tenant. Organizations/tenants may be any firm, corporation, institution, association, or society that has contracted with an administrator of the web server 104 to provide users access to the organization's/tenant's applications, including associated web pages, via the client devices 102$_1$-102$_N$. Accordingly, the web server 104 may provide web pages from multiple tenants to various client devices 102$_1$-102$_N$.

In one implementation, the web server 104 may be any computing device that provides users access to resources via the client devices 102$_1$-102$_N$ and the network(s) 106. For example, the web server 104 may be a multi-tenant server that provides users of the client devices 102$_1$-102$_N$ access to one or more applications. The applications (sometimes referred to as client applications or web applications) and other resources provided by the web server 104 (e.g., processing resources, storage resources, etc.) may be maintained and managed by the web server 104 and made available to users of client devices 102$_1$-102$_N$ as needed (i.e., "on-demand"). For instance, upon a user of a client device 102$_1$-102$_N$ requesting a web page of an application served by the web server 104 via a web browser 108$_1$-108$_N$ (e.g., the user entering a uniform resource locator (URL) into an address bar of the web browser 108$_1$ or the user clicking a link of a current web page displayed in the web browser 108$_1$), the requesting client device 102$_1$-102$_N$ may transmit a request for the web page to the web server 104 using the network(s) 106. The request may include sub-requests, or the request may otherwise be a batch request, for information from each component of the web page. In response, the web server 104 may generate or otherwise access a configuration and/or other data that describes the web page, including each component of the web page, and the web server 104 and/or the client devices 102$_1$-102$_N$ may use this configuration and/or other data to generate a set of files that represents the web page (e.g., a set of Hypertext Markup Language (HTML) files). When generated by the web server 104, the set of files representing the web page may be thereafter transmitted to the requesting client device 102$_1$-102$_N$ via the network(s) 106. In some implementations, as described in greater detail herein, prefetchers 110$_1$-110$_N$ may request the web page optimizer 112 to transmit information for one or more web pages that are predicted to be requested by a user of the client devices 102$_1$-102$_N$. This information may include metadata (e.g., a configuration that describes the web page, including each component of the web page), record/content data (e.g., records/content to be displayed in the component), and/or a set of files representing the web page. Accordingly, although in some implementations, web pages may be specifically requested by user of the client devices 102$_1$-102$_N$ before information regarding these web pages are provided to the client devices 102$_1$-102$_N$, in other implementations, this information is provided proactively (i.e., in anticipation of a request from a user).

The web server 104 may include various elements of hardware and software of a multi-tenant system. As used herein, the term "multi-tenant system" refers to those systems in which various elements of hardware and software may be shared by one or more tenants. For example, the web server 104 may simultaneously process requests for a great number of tenants, and a given database table may store records for a potentially much greater number of tenants. The web server 104 may include an application platform including a framework that allows applications to execute, such as the hardware or software infrastructure of the system. In one implementation, the application platform enables the creation, management, and execution of one or more applications developed by the provider of the web server 104, users accessing the web server 104 via client devices 102$_1$-102$_N$, or third-party application developers.

In some implementations, the web server 104 may include or may have access to a database or another repository of components. The components may be used across web pages, applications, and/or tenants or may be specific for a particular web page, applications, and/or tenant. For example, a first tenant may design a first component that is used exclusively for web pages and applications associated with the first tenant while a second tenant may design a second component that may be used by web pages and applications of other tenants, including the first tenant. Both the first component and the second component may be stored in the database of components such that the web server 104 may have access to these components when configuring and generating a web page.

Figure 2B:
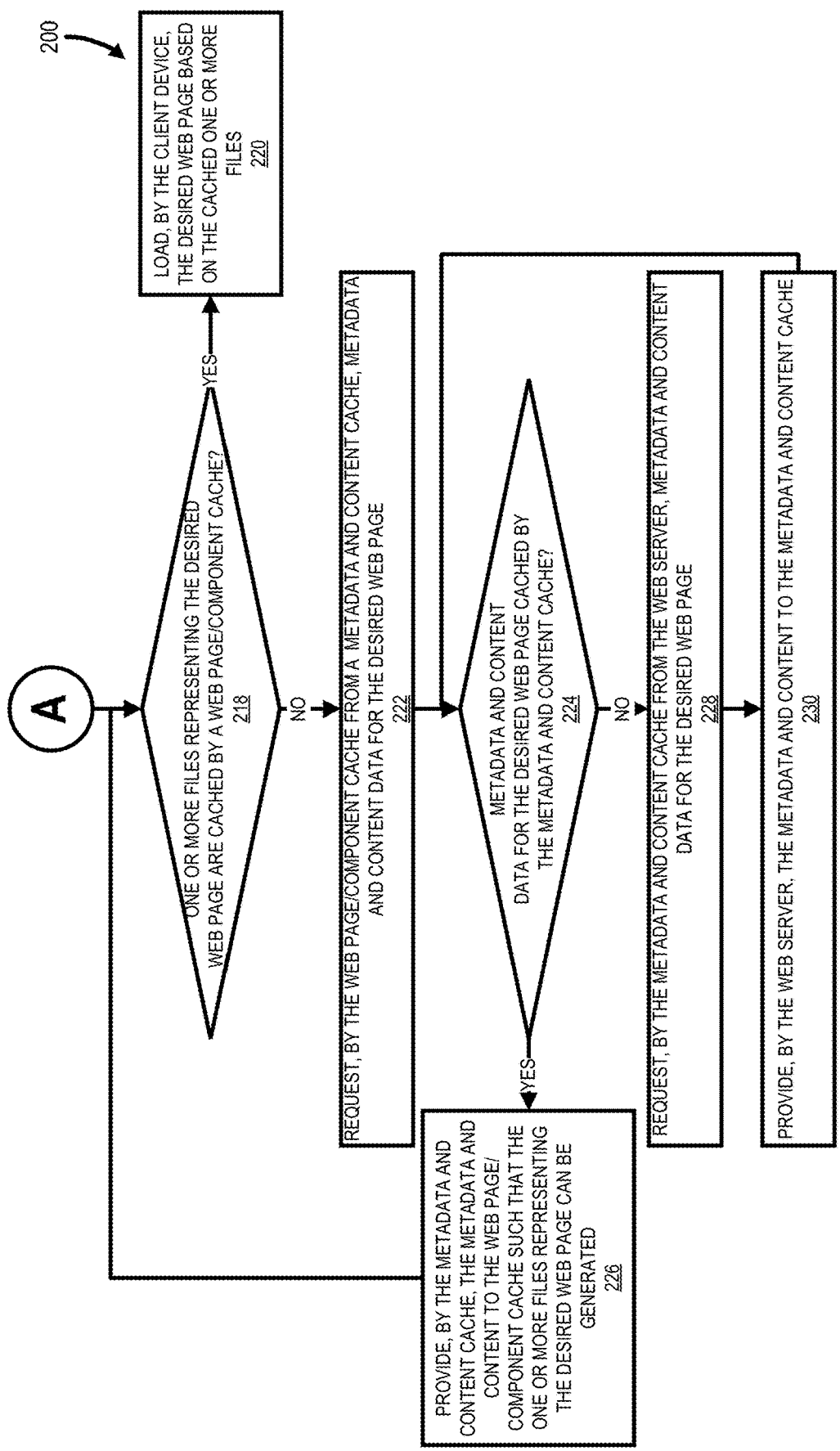

Turning now to FIGS. 2A and 2B, a method 200 according to some implementations will be described for intelligently prefetching and caching data associated with web pages, including one or more components, based on usage patterns of a user and/or performance metrics of web pages. In particular, the web server 104 may determine, based at least partly on usage patterns of the user and/or performance metrics of loading, transmitting, processing, and/or caching a predicted web page, to prefetch and cache a predicted web page of a web application such that the predicted web page and associated components are readily available for the user upon request. By prefetching and caching predicted web pages, the predicted web pages and associated components are at least partially available for the user prior to a request from the user. In particular, prior to a selection by a user to navigate to a web page, (1) metadata associated with a predicted web page and/or a component may be at least partially transferred from the web server 104 to a requesting client device 102$_1$-102$_N$, (2) content data to be presented within the components of the predicted web page may be at least partially transferred from the web server 104 to the requesting client device 102$_1$-102$_N$, and/or (3) one or more files representing the predicted web page may be generated based on the metadata and/or the content data. In this fashion, presenting content data within components of the web pages may be performed with reduced delay when intelligent and accurate predictions can be made.

The operations in the flow diagram of FIGS. 2A and 2B will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams.

Although described and shown in FIGS. 2A and 2B in a particular order, the operations of the method 200 are not restricted to this order. For example, one or more of the operations of the method 200 may be performed in a different order or in partially or fully overlapping time periods. Accordingly, the description and depiction of the method 200 is for illustrative purposes and is not intended to restrict to a particular implementation.

Figure 3:
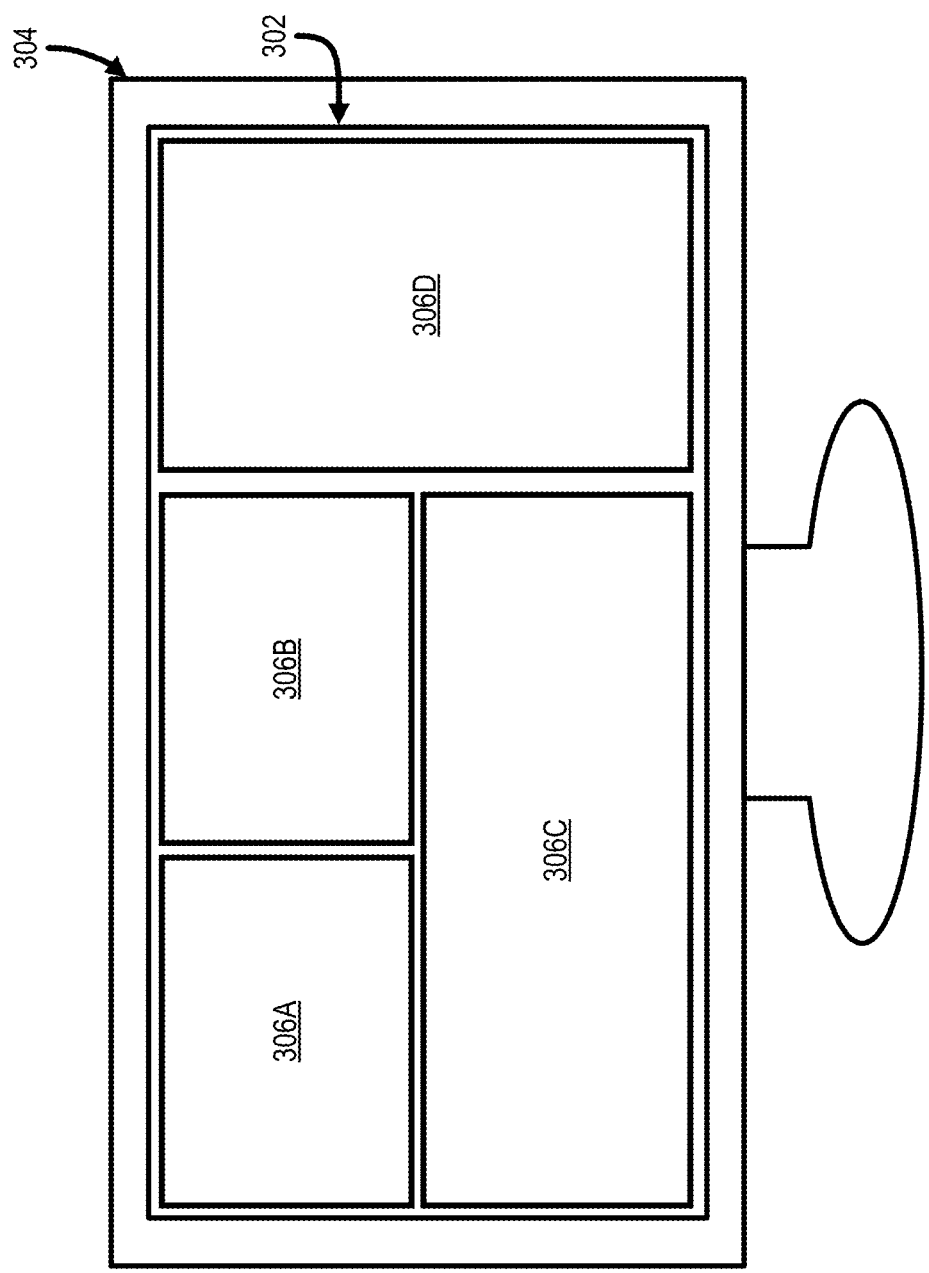
FIG. 3 shows a web page presented to a user via a display of a client device, according to one example implementation.

As shown in FIGS. 2A and 2B, the method 200 may commence at operation 202 with a client device 102$_1$-102$_N$ loading an initial/current web page for a web application. For example, the web browser 108$_1$ of the client device 102$_1$ may load a home web page associated with a web application (i.e., the first web page that is presented to the user when the user starts or logs into the web application). In some implementations, the current web page may be configured by the user or may be automatically generated based on determined preferences of the user of the client device $102_1$. For example, the user may indicate the presence and placement of particular components in the home web page and/or the presence and placement of the components may be determined automatically based on usage of the web application by the user. Although described as a home web page, operation 202 may load any web page of the web application at operation 202 (i.e., the current web page may be navigated to at some time/point after interacting with a home page of the web application). FIG. 3 shows an example of a current web page 302 that is loaded by a web browser $108_1$ and presented on a display 304 of the client device $102_1$ at operation 202.

Figure 4:
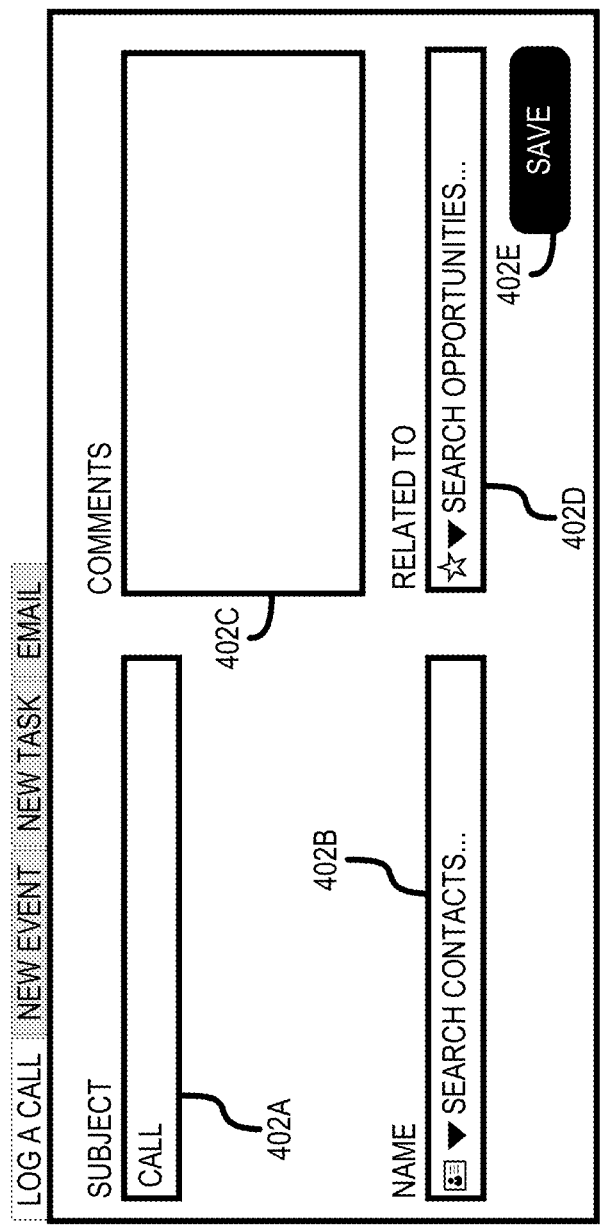
FIG. 4 shows an example of a component, according to one example implementation.

As shown in FIG. 3, the web page 302 includes the components 306A-306D. The components 306A-306D may be or may include display elements, including one or more of texts boxes, buttons, drop down menus, and labels. For example, the component 306A may be a call logging component that allows a user to record and/or lookup phone calls, the component 306B may be a news feed component that presents news articles to the user (e.g., parts/snippets of the news articles, including links, synopses, or sentences from the full news articles), the component 306C may be a weather component that displays weather conditions at a location to the user, and the component 306D may be an email preview component that displays a brief synopsis of email messages received at an email account (e.g., subject line, time received, etc.) to the user. FIG. 4 shows an example of the component 306A. In this example, the component 306A is a call logging component with five display elements 402A-402E for assisting the user log calls. The web page 302, including the components 306A-306D, will be used during the remainder of the description of the method 200. However, the method 200 may be used in conjunction with any set of component-based web pages and corresponding web application. Thus, the use of the web page 302 and corresponding components 306A-306D is illustrative and is not intended to limit the use of the method 200.

At operation 204, the prefetcher $110_1$ of the web browser $108_1$ of the client device $102_1$ may transmit an optimization request to the web page optimizer 112 of the web server 104. The optimization request asks the web page optimizer 112 of the web server 104 to determine at operation 206 whether there are any predictive prefetching and caching suggestions (e.g., web pages to prefetch and cache prior to selection of a web page by the user). In one implementation, the determination as to whether there are any predictive prefetching and caching suggestions is based on the current web page 302 loaded by the web browser $108_1$, including the current set of components in the current web page 302 loaded by the web browser $108_1$, and usage patterns of the user in relation to the current web page 302. The usage patterns may include one or more of (1) click interactions by the user in web pages (e.g., the current web page 302), (2) click paths by the user in web pages (e.g., the current web page 302), and (3) general navigation patterns between web pages (e.g., which web pages the user visits from the current web page 302 and the frequency or likelihood of such visits). As used herein, click interactions are clicks/selections by the user in web pages during a session using a pointer or another virtual selection tool. For example, during one or more previous sessions, a user of the current web page 302 may have used a mouse, trackpad, or another selection device of the client device $102_1$ to click one or more components 306A-306D in the current web page 302. Each click interaction may include the context of the interaction (e.g., the component 306A-306D clicked, the display element within the component 306A-306D clicked, the time of the click, and the action performed after the click (e.g., enter data to log a call, navigate to another web page, etc.)).

As used herein, a click path is the sequence/path of clicks or actions by a user through web pages during a session. For example, during one or more previous sessions, a user of the current web page 302 may have used a mouse, trackpad, or another similar device of the client device $102_1$ to move a virtual pointer through the current web page 302. The path through the current web page 302 taken by the virtual pointer is a click path. Each click path may include the context of the click path (e.g., the components 306A-306D traversed, timing information associated with the click path, and/or a web page visited following the click path).

As used herein, navigation patterns describe the movements between web pages in a web application. For example, when a user of a web application clicks a link in a first web page, which directs the web browser to a second web page, the movement from the first web page to the second web page is captured in the navigation patterns associated with the user. Accordingly, the navigation patterns, which may be also described in a click interaction or a click path, describe navigation between web pages. As used herein, each web page may be defined by a unique set of components and records. Accordingly, altering the set of components and/or records displayed/presented/included in a web page results in a different web page. For example, when a user clicks a link or button in a web page that causes the browser to load an additional component to the web page, this web page with an additional component is a different web page from the web page prior to the click (i.e., prior to the loading of the additional component).

These click interactions, click paths, and/or navigation patterns, which are hereinafter collectively or individually referred to as usage patterns, may be recorded and stored for each session in which the user is interacting with web pages of a web application (e.g., between the user logging into or navigating to a web application and the user logging out of or navigating away from the web application). For example, the client device $102_1$ may capture/record click interactions, click paths, and navigation patterns and report this information (at completion of a session or in a batch after completion of multiple sessions) for storage on the web server 104 in a database or another storage structure.

Figure 5A:
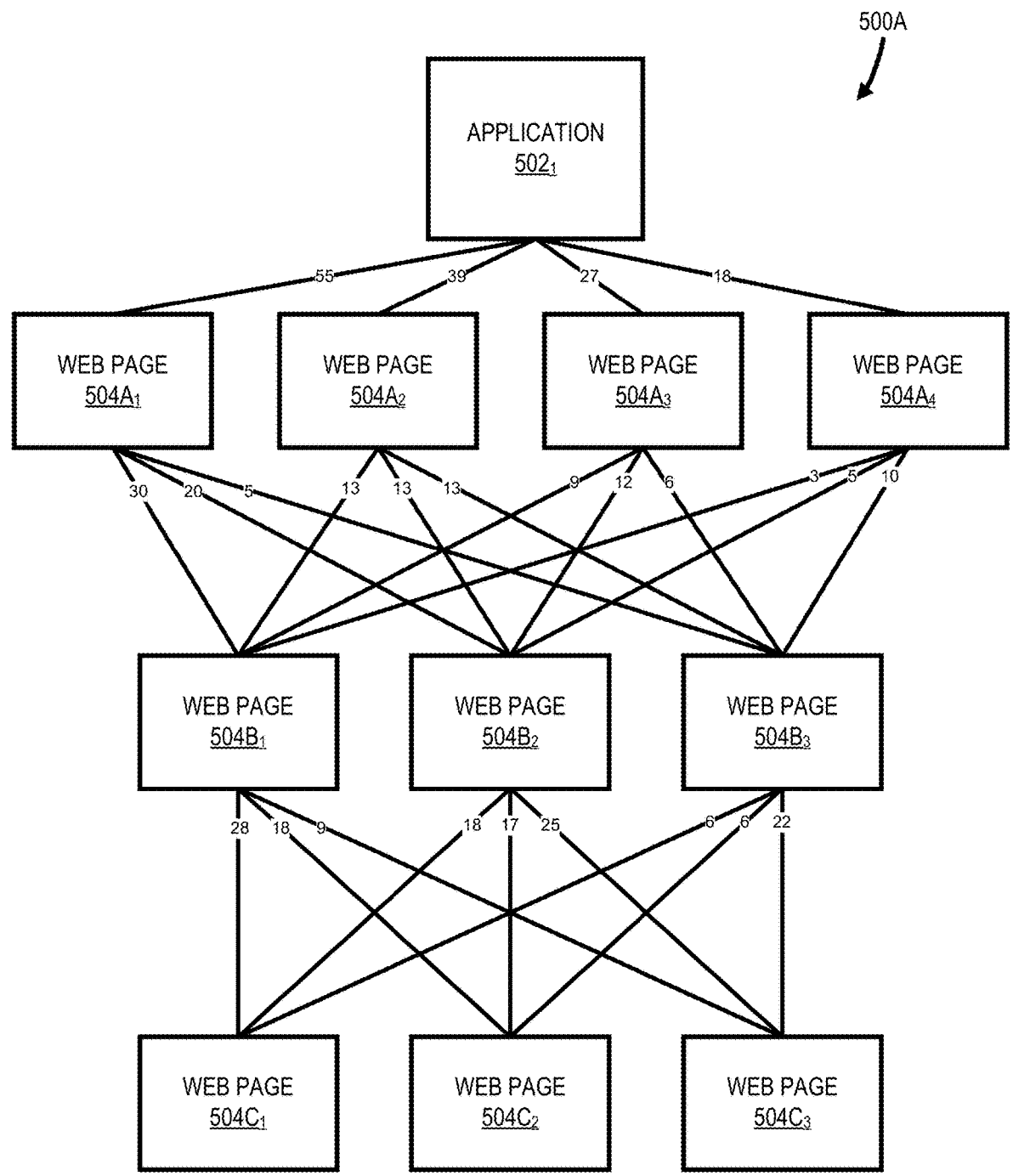
FIG. 5A shows a prediction tree that is constructed based on a first set of usage patterns of a user in relation to different web pages of a first web application, according to one example implementation.

These usage patterns may be retrieved or otherwise determined by the web server 104 and used to determine whether there are any predictive prefetching and caching suggestions (e.g., web pages, including a set of components, to prefetch and cache) at operation 206. For example, FIG. 5A shows a prediction tree 500A that is constructed based on usage patterns of a user in relation to different web pages 504 of a web application $502_1$. As will be described in greater detail below, the current web page 302 may be represented by one of the web pages 504 shown in the prediction tree 500A. The prediction tree 500A of FIG. 5A shows the number of times a user of the web application $502_1$ has visited other web pages 504 from a particular starting point/location (e.g., another web page 504 or at the start of the web application $502_1$). For example, the web application $502_1$ may begin with a web page 504 selected from the first set of web pages $504A_1$-$504A_4$. As shown, the prediction tree 500A includes vertices between the web application $502_1$ and each of the web pages 504 in the first set of web pages $504A_1$-$504A_4$. Similarly, each of the web pages 504 in the first set of web pages $504A_1$-$504A_4$ includes vertices to one or more web pages 504 in a second set of web pages $504B_1$-$504B_3$. Finally, each of the web pages 504 in the second set of web pages $504B_1$-$504B_3$ includes vertices to one or more web pages 504 in a third set of web pages $504C_1$-$504C_3$. The vertices indicate the number of times the user has historically navigated to a corresponding web page 504 in the sets of web pages 504A-504C from the web application $502_1$ or another web page 504 (e.g., navigated in a previous session).

For example, as shown in the prediction tree 500A of FIG. 5A, the web page optimizer 112 may determine that for the current user, the web application $502_1$ has started on (1) the web page $504A_1$ fifty-five times, (2) the web page $504A_2$ thirty-nine times, (3) the web page $504A_3$ twenty-seven times, and (4) the web page $504A_4$ eighteen times. When the web application $502_1$ is on the web page $504A_1$, the user has navigated to (1) the web page $504B_1$ thirty times, (2) the web page $504B_2$ twenty times, and (3) the web page $504B_3$ five times. Similarly, the web page optimizer 112 may determine that from the web page $504B_1$, the user has navigated to (1) the web page $504C_1$ twenty-eight times, (2) the web page $504C_2$ eighteen times, and (3) the web page $504C_3$ nine times. As shown in FIG. 5A, corresponding determinations are made for other permutations of web pages 504.

Figure 5B:
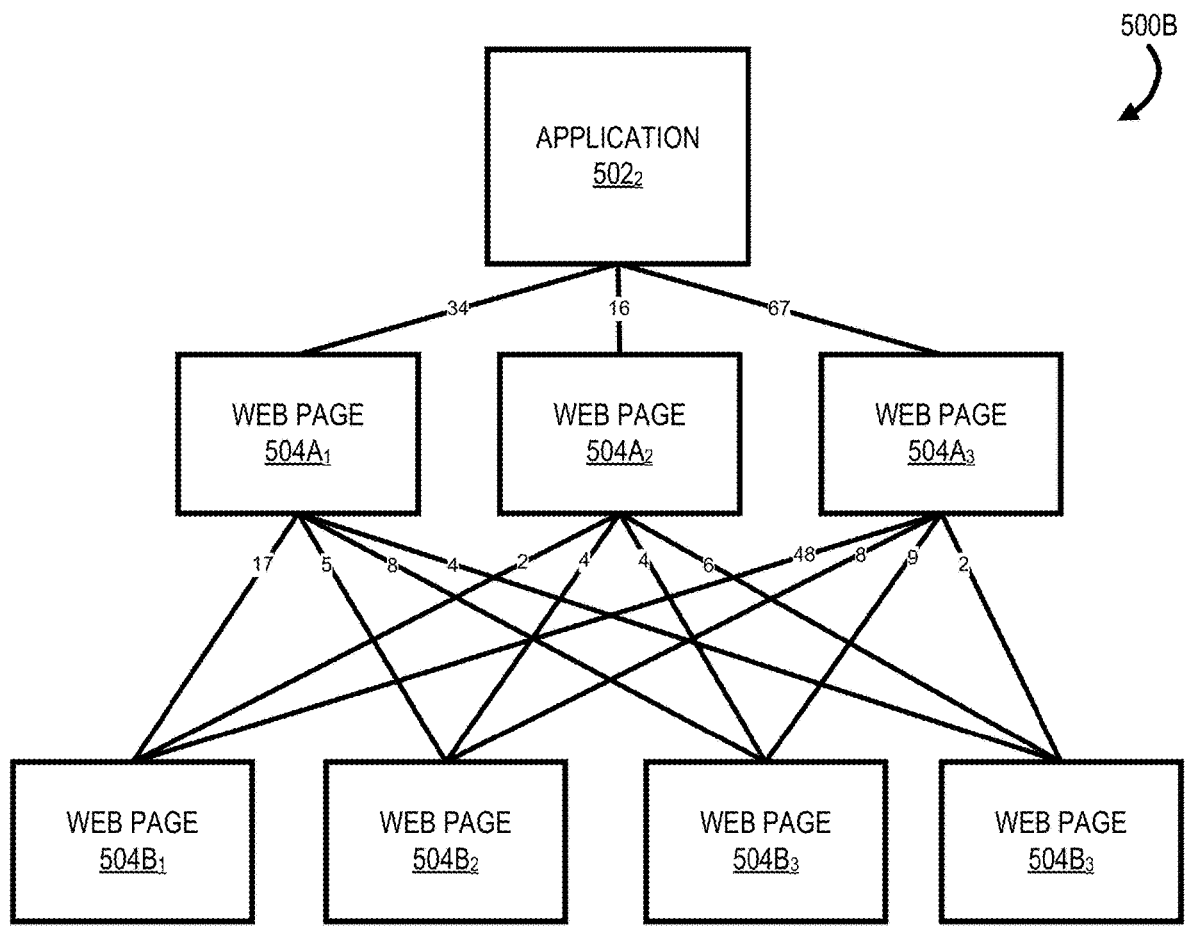
FIG. 5B shows a prediction tree that is constructed based on a second set of usage patterns of a user in relation to different web pages of a second web application, according to one example implementation.

Although described and shown in FIG. 5A for a single web application 502 (i.e., the web application $502_1$), the web page optimizer 112 may determine similar prediction trees in relation to other web applications 502. For example, FIG. 5B shows a prediction tree 500B for the user of the client device $102_1$ in relation to the web application $502_2$. In the prediction tree 500B of FIG. 5B, the usage patterns are shown in relation to a first set of web pages $504A_1$-$504A_3$ and a second set of web pages $504B_1$-$504B_3$. Further, although described in relation to a single user, the web page optimizer 112 may determine similar prediction trees for multiple users of the client devices $102_1$-$102_N$. Additionally, while the prediction trees 500A and 500B are shown in relation to three and two levels of sets of web pages 504, respectively, in other implementations, any number of levels of sets of web pages 504 may be tracked by the web server 104.

As noted above, these predictions trees 500A and 500B may be generated using the usage patterns (e.g., click interactions, click paths, and/or navigation patterns) recorded for users. Accordingly, the predictions trees may be considered as representations of the usage patterns recorded by the web server 104. Although shown as trees, usage patterns may be represented in any structure or form.

Based on the usage patterns of the user of the client device $102_1$, represented here by way of example, in the prediction tree 500A of FIG. 5A, the web page optimizer 112 may attempt to predict a web page 504 that the user will navigate to and determine at operation 206 based on this prediction that prefetching and caching of the predicted web page 504 is warranted. For example, when the current web page 302 of operation 202 is the web page $504A_2$, the web page optimizer 112 may not be able to determine a predicted web page 504 at operation 206 (e.g., the user has navigated equally to the web pages $504B_1$-$504B_3$ from the web page $504A_2$ such that no intelligent prediction can be made regarding a likely future navigation action of the user). In response to this failure to make a prediction at operation 206, the web page optimizer 112 may transmit a response to the prefetcher $110_1$ at operation 208 that no prefetching/caching should be performed. Since no prefetching is to be performed, loading of web pages 504 by the client device $102_1$ will be performed on-demand from the web server 104 at operation 210 (e.g., the user selects a desired web page 504 and the web browser $108_1$ subsequently requests information (e.g., metadata and content data) from the web server 104 to load and render this desired web page 504).

In some implementations, the web page optimizer 112 may determine a predicted web page 504 at operation 206. For example, when the current web page 302 of operation 202 is the web page $504A_1$, the web page optimizer 112 may determine that the user is likely to request the web page $504B_1$. This determination is made based on the user historically visiting the web page $504B_1$ from the web page $504A_1$ more than any other web page 504 (e.g., more than the web page $504B_2$ and the web page $504B_3$, or any other web page 504 represented in the prediction tree 500A) as demonstrated by the usage patterns of the user (e.g., as shown by the prediction tree 500A). In response to determining that the user is likely to request the web page $504B_1$, the web page optimizer 112 may determine at operation 206 that the web page $504B_1$ should be prefetched and cached preemptively (i.e., in anticipation that the user will select/navigate to the web page $504B_1$). In response to determining that a web page 504 should be prefetched and cached at operation 206 (e.g., the web page $504B_1$), the method 200 may move to operation 212 to transmit information describing the predicted web page 504 to the client device $102_1$ such that the client device $102_1$ may begin caching the information at operation 214. For purposes of illustration, the method 200 hereinafter will be described in relation to the current web page 302 being the web page $504A_1$ and the predicted web page 504 being the web page $504B_1$.

In some implementations, the prediction of web pages 504 may include not just components 306 present in the predicted web page $504B_1$ but also records/content displayed by the components 306. In particular, the usage patterns may determine that the user often views, modifies, or otherwise interacts with particular client records in relation to the predicted web page $504B_1$ (i.e., interacts with a particular set of records more than other records in a database of records). For example, the user may interact with a first record corresponding to a first client and a second record corresponding to a second client when using the predicted web page $504B_1$. Accordingly, the predicted web page $504B_1$ may not include just a set of components 306 but also a set of records that are commonly viewed by the user (e.g., above a threshold or interacted with more than other records from a database of records).

Although the determination of prefetching and caching at operation 206 is described above in relation to only usage patterns of the user, in some implementations additional factors may be considered by the web page optimizer 112. For example, in some implementations performance metrics may be used by the web page optimizer 112 for determining whether prefetching and caching should be performed for the predicted web page $504B_1$. In particular, the performance metrics may be used for determining whether prefetching and caching the predicted web page $504B_1$ produces a significant improvement in user experience. For example, when the time difference between on-demand loading of the predicted web page $504B_1$ and loading the prefetched/cached predicted web page $504B_1$ is greater than a threshold time value, then the web page optimizer 112 may determine at operation 206 that prefetching and caching the predicted web page $504B_1$ is warranted/suggested. Otherwise, when the time difference between on-demand loading of the predicted web page $504B_1$ and loading the prefetched/cached predicted web page $504B_1$ is less than a threshold time value, then the web page optimizer 112 may determine at operation 206 that prefetching and caching the predicted web page $504B_1$ is not warranted/suggested (i.e., no significant benefit exists).

To facilitate the operations of the web page optimizer 112 at operation 206 described above, each layer of the web application $502_1$ may be instrumented to capture performance metrics per user (e.g., per client device $102_1$-$102_N$) in addition to the usage patterns, per web page 504, and/or per component 306 of a web page 504. For example, the web pages 504 may include or be associated with a client device layer, a network layer, a web server layer, and a cache layer such that client device metrics may be recorded for the client device layer, network metrics may be recorded for the network layer, web server metrics may be recorded for the web server layer, and cache metrics may be recorded for the cache layer. In one implementation, the client device metrics include one or more of web browser processing time, Javascript® execution time, component creation time, and component rendering time. Accordingly, the client device metrics may capture the time needed by a client device $102_1$-$102_N$ to load/present a web page 504 to the user after the user has selected to navigate to the web page 504. This determination may be made under various conditions, including when the selected web page 504 has been partially or fully fetched, cached, and corresponding files representing the selected web page 504 generated and/or when the selected web page 504 is retrieved entirely on-demand (e.g., metadata and/or record/content data representing the selected web page 504 are retrieved only after the user has selected to navigate to the selected web page 504).

In one implementation, network metrics include network latency and request/response sizes for each request. As used herein, latency is the time from the source (e.g., a client device $102_1$-$102_N$ or the web server 104) sending a packet (e.g., a request or a response to a request) to the destination (e.g., the web server 104 or a client device $102_1$-$102_N$) and the destination receiving the packet. This time excludes processing time by either the source (e.g., time associated with the client device $102_1$-$102_N$ processing/generating the request) or the destination (e.g., time associated with the web server 104 analyzing the request and/or fulfilling the request with a response). Accordingly, the network metrics may capture the time needed by the network 106 to transfer a selected web page 504 to the user after the user has selected to navigate to the web page 504. This time determination may be made under various conditions, including when the selected web page 504 has been partially or fully fetched, cached, and corresponding files representing the selected web page 504 generated and/or when the selected web page 504 is retrieved entirely on-demand (e.g., metadata and/or record/content data representing the selected web page 504 is retrieved only after the user has selected navigation to the selected web page 504).

In one implementation, web server metrics measure the total response time for the web server 104. For example, the time between the web server 104 receiving a request from a client device $102_1$-$102_N$ and the web server 104 transmitting a response to the request. In some implementations, the web server metrics may break down timing information per activity (e.g., per application programming interface (API) call or query). Accordingly, the web server metrics may capture the time needed by the web server 104 to load/present a web page 504 to the user after the user has selected to navigate to the web page 504. This determination may be made under various conditions, including when the selected web page 504 has been partially or fully fetched, cached, and corresponding files representing the selected web page 504 generated and/or when the selected web page 504 is retrieved entirely on-demand (e.g., metadata and/or record/content data representing the selected web page 504 is retrieved only after the user has selected navigation to the selected web page 504).

In one implementation, cache metrics measure the total time for caching metadata and/or record/content data for a prefetched web page 504 and/or individual components within the prefetched web page 504. For example, the time between requesting metadata and/or content data and the metadata and/or content data being stored in a cache on the client device $102_1$. In some implementations, the cache metrics may break down timing information per component in a web page 504.

Based on the client device metrics, the network metrics, the web server metrics, and the cache metrics, one or more additional performance metrics may be calculated/determined. For example, in some implementations, the performance metrics may include an experience page time (EPT) metric that measures the total time to load a web page as experienced by the user. The EPT metric may be defined as the time from user interaction (e.g., the user clicking on a link or submitting a request for a web page 504) to full loading of the web page 504 on the client device $102_1$-$102_N$ (e.g., until no further activity or input from the client device $102_1$-$102_N$, the network 106, and the web server 104 is required). In some implementations, a browser processing time (BPT) metric may be determined at operation 206 that measures the total time spent by a web browser $108_1$-$108_N$ of a client device $102_1$-$102_N$ for the web page 302. In some implementations, a network processing time (NPT) metric may be determined at operation 206 that measures the total time spent by the network(s) 106 for the web page 302. In some implementations, a sever processing time (SPT) metric may be determined at operation 206 that measures the total time spent by the web server 104 for the web page 302. In some implementations, a caching processing time (CPT) metric may be determined at operation 206 that measures the total time spent by the web server 104, the network(s) 106, and/or the client device $102_1$ for caching metadata and/or record/content data for a predicted web page 302. In some implementations, the EPT metric is defined by some function of the BPT metric, the NPT metric, the SPT metric, and the CPT metric. Each of the EPT metric, the BPT metric, the NPT metric, the SPT metric, and the CPT metric may be derived per user and per web page and may be stored in the web server 104 for retrieval at operation 206.

At operation 206, upon determining a predicted web page $504B_1$ based on the usage patterns of the user and/or a performance improvement above a threshold value based on performance metrics related to prefetching and caching the predicted web page $504B_1$, the method 200 may move to operation 212. Conversely, after failing to determine a predicted web page 504 and/or determining that a performance improvement is below a threshold value, the method 200 may move to operation 208. As noted above, at operation 208 the web page optimizer 112 may transmit a response to the prefetcher $110_1$ that no prefetching/caching should be performed. Since no prefetching/caching is to be performed, loading of web pages 504 will be performed on-demand from the web server 104 at operation 210 (e.g., the user selects a desired web page 504 and the web browser $108_1$ subsequently requests information from the web server 104 to load and render this desired web page 504).

In contrast, at operation 212 the web server 104 transmits information describing the predicted web page $504B_1$ to the client device $102_1$ (i.e., prefetching information describing the predicted web page $504B_1$ by the client device $102_1$). The information describing the predicted web page $504B_1$ may be transmitted in response to a request from the prefetcher $110_1$ of the client device $102_1$ and may include one or more of metadata describing the layout of the predicted web page $504B_1$, including one or more components 306 of the predicted web page $504B_1$, and content data describing records or other content to be displayed by the predicted web page $504B_1$ (e.g., displayed by a component 306 of the predicted web page $504B_1$).

Figure 6:
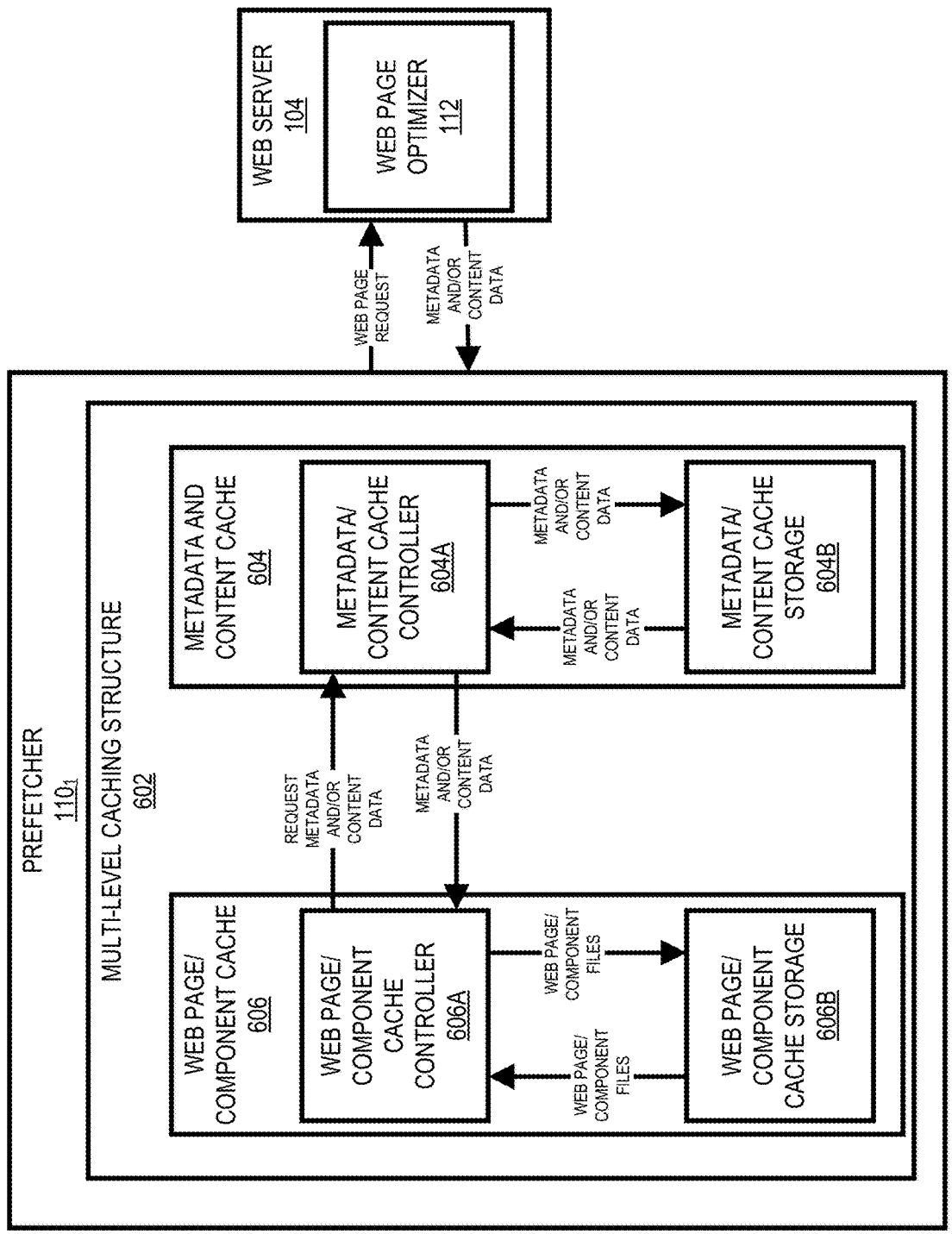
FIG. 6 shows a multi-level caching structure of a prefetcher, according to one example implementation.

At operation 214, the information describing the predicted web page $504B_1$ may be cached by the client device $102_1$. In some implementations, caching of the predicted web page $504B_1$ may include storing/caching information describing the predicted web page $504B_1$ in a multi-level caching structure at operation 214. For example, FIG. 6 shows a multi-level caching structure 602 of the prefetcher $110_1$ according to one example implementation. As shown in FIG. 6, the caching structure 602 may include a metadata and content cache 604 and a web page/component cache 606. In this example implementation, as metadata and/or content data is received from the web server 104, the metadata/content cache controller 604A may store/cache this received information in the metadata/content cache storage 604B. The information stored/cached in the metadata/content cache storage 604B may thereafter be used to generate one or more files representing the predicted web page $504B_1$. For example, when all of the metadata and content data for the predicted web page $504B_1$ are loaded into the metadata/content cache storage 604B, one or more files representing the predicted web page $504B_1$ may be generated. The one or more files representing the predicted web page $504B_1$ may include one or more HTML files or other types of files used by the browser $108_1$ to present the predicted web page $504B_1$ to the user. In some implementations, the one or more files may represent components 306 that comprise the predicted web page $504B_1$ or are added to the current web page $504A_1$ to arrive at the predicted web page $504B_1$. The one or more files representing the predicted web page $504B_1$ may be passed to the web page/component cache 606 for storage/caching. For example, the web page/component cache controller 606A may receive the one or more files representing the predicted web page $504B_1$ and store/cache the one or more files representing the predicted web page $504B_1$ in the web page/component cache storage 606B. Accordingly, as described above, as metadata and content data are loaded into the metadata and content cache 604, files may be generated and cached for the predicted web page $504B_1$, which are cached in the web page/component cache 606.

Although described in relation to a single web page 504 being cached in the caching structure 602 (e.g., the predicted web page $504B_1$), in other implementations multiple web pages 504 may be cached in the caching structure 602. For example, metadata and/or content data for a first number of predicted web pages 504 may be stored in the metadata and content cache 604 and files representing a second number of predicted web pages 504 may be stored in the web page/component cache 606. In this example, the second number may be less than or equal to the first number.

As memory utilization of the one or more files representing the predicted web page $504B_1$ is higher than the memory utilization of metadata and content data, a time-to-live (TTL) cache duration may be established for each cache (i.e., a TTL for the metadata and content cache 604 and a TTL for the web page/component cache 606). For example, each file stored in the web page/component cache 606 (i.e., each file representing the predicted web page $504B_1$ and/or a component 306 of the predicted web page $504B_1$) may be stored for up to fifteen minutes (e.g., the TTL for the web page/component cache 606 is fifteen minutes) before eviction. In some implementations, the web page/component cache controller 606A checks the web page/component cache storage 606B periodically prior to eviction of files/data (e.g., periodically between two and fifteen minutes since a file was added to the web page/component cache storage 606B) to determine if there is any newer information in the metadata and content cache 604 and refreshes as appropriate.

Similarly, each piece of metadata/content data stored in the metadata and content cache 604 may be stored for up to thirty minutes (e.g., the TTL for the metadata and content cache 604 is thirty minutes) before eviction. In some implementations, the metadata/content cache controller 604A checks periodically prior to eviction of data (e.g., periodically between fifteen and thirty minutes since the piece of metadata or content data was added to the metadata/content cache storage 604B) to determine if there is any newer information in the web server 104 and refreshes as appropriate.

After commencing prefetching and caching of a predicted web page $504B_1$ at operations 212 and 214, respectively, the user may select/request a web page 504 at operation 216. For example, the user may click a link or button in the current web page $504A_1$ that directs the browser $108_1$ to load a desired web page 504. At operation 218, the web page/component cache controller 606A may determine if one or more files representing the desired web page 504 are cached in the web page/component cache storage 606B. For example, when the desired web page 504 is the predicted web page $504B_1$, the web page/component cache controller 606A may determine at operation 218 that one or more files representing the desired web page 504 are cached in the web page/component cache storage 606B (e.g., when enough time has elapsed for the metadata and content data from for the predicted web page $504B_1$ to be cached and used to generate the one or more files, the one or more files may be cached in the web page/component cache storage 606B). In response to determining at operation 218 that one or more files representing the desired web page 504 are cached in the web page/component cache storage 606B, the method 200 may move to operation 220 to load the desired web page 504 based on the cached one or more files.

In some implementations, the web page/component cache controller 606A may determine at operation 218 that the one or more files of the desired web page 504 are partially generated/completed. In response, the web page/component cache controller 606A may wait for the files to be completed without a further request to either the metadata and content cache 604 or the web server 104.

In response to determining that one or more files representing the desired web page 504 are not cached in the web page/component cache storage 606B, the web page/component cache controller 606A may request at operation 222 metadata and content data for the desired web page 504 from the metadata and content cache 604 such that one or more files for the desired web page 504 may be generated. Following the request of operation 222, the metadata/content cache controller 604A may determine at operation 224 if metadata and content data for the desired web page 504 are stored/cached in the metadata/content cache storage 604B.

In response to determining at operation 224 that metadata and content data for the desired web page 504 are stored/cached in the metadata/content cache storage 604B, the metadata and content cache 604 may provide the metadata and content data for the desired web page 504 to the web page/component cache 606 at operation 226 such that one or more files representing the desired web page may be generated and cached in the web page/component cache 606. Subsequently, the method 200 may move to operation 218 to verify the one or more files representing the desired web page were stored/cached in the web page/component cache 606.

In response to determining at operation 224 that metadata and content data for the desired web page 504 are not stored/cached in the metadata/content cache storage 604B, the metadata and content cache 604 may request at operation 228 the metadata and content data for the desired web page 504 from the web server 104. At operation 230, the web server 104 may provide/transmit the metadata and content data to the metadata/content cache controller 604A for storage/caching in the metadata/content cache storage 604B. Subsequent to transmission at operation 230, the method 200 may return to operation 224 to verify the metadata and content data was cached in the metadata/content cache storage 604B.

As described above, the web server 104 and/or the client devices 102$_1$-102$_N$ may intelligently prefetch web pages 504, including components 306, prior to selections/requests from the user. In particular, a web page optimizer 112 of the web server 104 may assist prefetchers 110$_1$-110$_N$ of the web browsers 108$_1$-108$_N$ of the client devices 102$_1$-102$_N$ to intelligently prefetch component-based web pages 504 (i.e., prefetch one or more of metadata and content data) based on (1) usage patterns of the users of the client devices 102$_1$-102$_N$ in relation to web pages 504 and/or (2) performance metrics associated with each web page 504 (e.g., client device metrics describing the loading of web pages 504 on a client device 102$_1$-102$_N$, network metrics describing fulfillment of requests for web page 504 over the network(s) 106, web server metrics describing generation/serving web pages 504 by the web server 104, and caching metrics describing caching of metadata and/or content data of the web pages 504) to provide an improved user experience. Namely, the intelligent fetching and caching of metadata and/or content data may reduce the time between a user of a client device 102$_1$-102$_N$ selecting/requesting a particular web page, which is comprised of a set of components 306, and the web page 504 being fully loaded in a browser 108$_1$-108$_N$ of the client device 102$_1$-102$_N$. As a result of this intelligent prefetching of a predicted web page, user experience may be improved when the prediction is correct (i.e., the user selects/requests the predicted web page 504 and the predicted web page 504 is displayed without the need to wait for requesting data/information from the web server 104 and processing by the web browser 108$_1$) while not providing a negative impact when the prediction is incorrect (i.e., a selected web page 504, which is not the predicted web page 504, is fetched and loaded in an on-demand/non-predictive manner).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 7A:
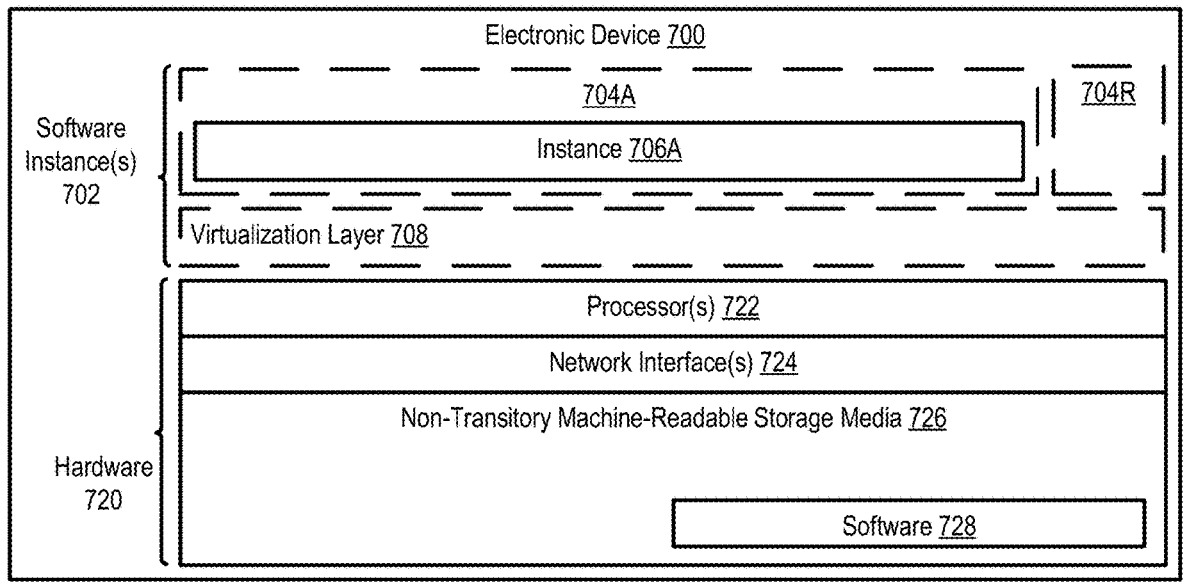
FIG. 7A illustrates an electronic device according to one example implementation.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and non-transitory machine-readable storage media 726 having stored therein software 728 (which includes instructions executable by the set of one or more processor(s) 722). Each of the previously described web browsers 108 and the web page optimizer 112 may be implemented in one or more electronic devices 700. In one implementation: 1) each of the web browsers 108 is implemented in a separate one of the electronic devices 700 (e.g., in client devices 102 operated by users where the software 728 represents the software to implement web browsers 108 to interface with the web page optimizer 112); 2) the web page optimizer 112 is implemented in a separate set of one or more of the electronic devices 700 (e.g., a set of one or more server electronic devices where the software 728 represents the software to implement the web page optimizer 112); and 3) in operation, the electronic devices implementing the web browsers 108 and the web page optimizer 112 would be communicatively coupled (e.g., by a network) and would establish between them (or through one or more other layers) connections for submitting web page/prefetch requests to the web page optimizer 112 and returning metadata and/or content data representing a web page and/or a set of components 306 to the web browsers 108. Other configurations of electronic devices may be used in other implementations (e.g., an implementation in which the web browser 108 and the web page optimizer 112 are implemented on a single electronic device 700).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7B:
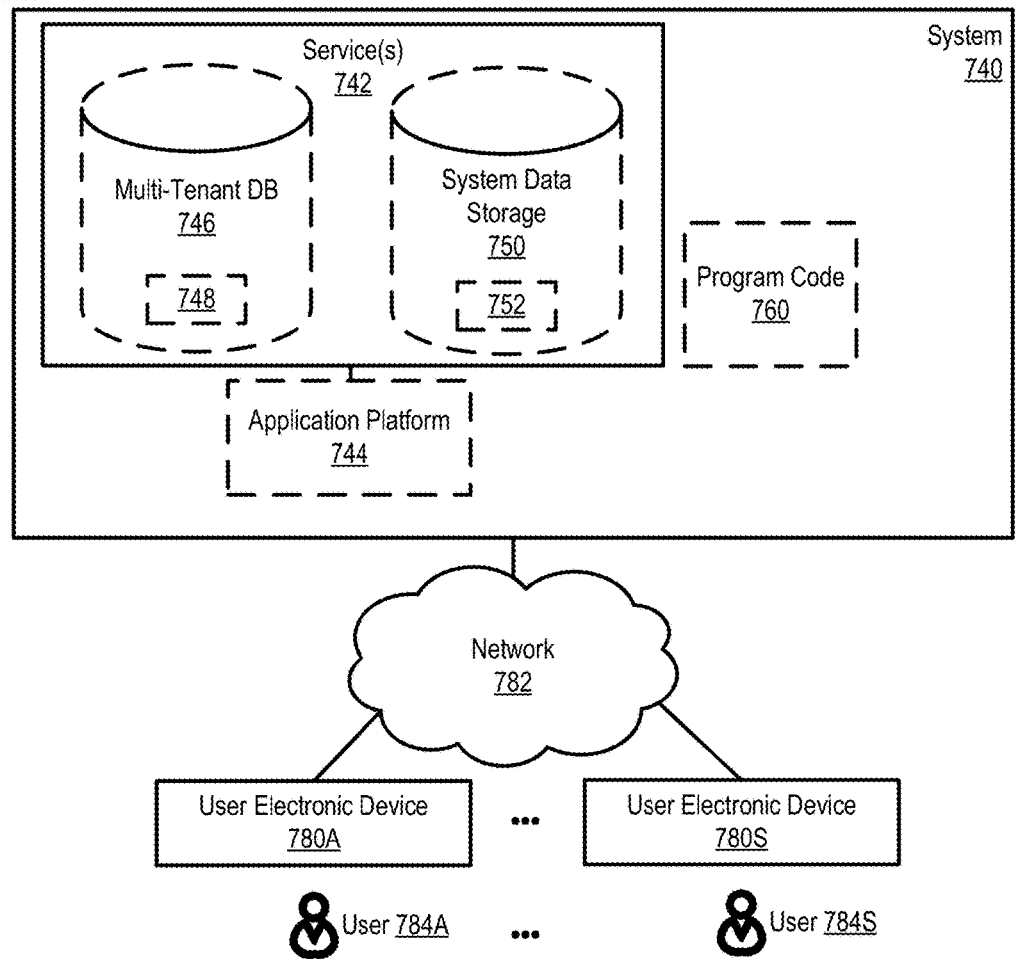
FIG. 7B shows a block diagram of an environment where the computing environment and the web server may be implemented according to one example implementation.

FIG. 7B is a block diagram of an environment where the computing environment 100 may be deployed, according to some implementations. A system 740 includes hardware (a set of one or more electronic devices) and software to provide service(s) 742, including the web page optimizer 112. The system 740 is coupled to user electronic devices 780A-S over a network 782. The service(s) 742 may be on-demand services that are made available to one or more of the users 784A-S working for one or more other organizations (sometimes referred to as outside users) so that those organizations do not need to necessarily be concerned with building and/or maintaining a system, but instead makes use of the service(s) 742 when needed (e.g., on the demand of the users 784A-S). The service(s) 742 may communication with each other and/or with one or more of the user electronic devices 780A-S via one or more Application Programming Interface(s) (APIs) (e.g., a Representational State Transfer (REST) API). The user electronic devices 780A-S are operated by users 784A-S.

In one implementation, the system 740 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 740 may include an application platform 744 that enables PAAS for creating, managing, and executing one or more applications developed by the provider of the application platform 744, users accessing the system 740 via one or more of user electronic devices 780A-S, or third-party application developers accessing the system 740 via one or more of user electronic devices 780A-S.

In some implementations, one or more of the service(s) 742 may utilize one or more multi-tenant databases 746 for tenant data 748, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user electronic device 780A-S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the one or more multi-tenant database 746 and/or system data storage 750.

In some implementations, the service(s) 742 are implemented using virtual applications dynamically created at run time responsive to queries from the user electronic devices 780A-S and in accordance with metadata, including: 1)

metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the web page optimizer 112, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 740 and the user electronic devices 780A-S.

Each user electronic device 780A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 740. For example, the user interface device can be used to access data and applications hosted by system 740, and to perform searches on stored data, and otherwise allow a user 784 to interact with various GUI pages that may be presented to a user 784. User electronic devices 780A-S might communicate with system 740 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 780A-S might include an HTTP client, commonly referred to as a "browser," for sending and receiving HTTP messages to and from server(s) of system 740, thus allowing users 784 of the user electronic device 780A-S to access, process and view information, pages and applications available to it from system 740 over network 782.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for intelligently prefetching a web page of a web application for a user, the method comprising:

loading, by a client device, a current web page of the web application in a web browser of the client device;

determining a predicted web page based on the current web page and usage patterns of the user, wherein the predicted web page is a web page the user is predicted to navigate to from the current web page;

prefetching, by the client device, metadata and content data describing the predicted web page from a web server prior to the user requesting the predicted web page; and caching, by the client device, the metadata and content data describing the predicted web page in a multi-level caching structure, wherein the usage patterns include a set of historic click paths by the user in the current web page, wherein a historic click path describes a movement of a virtual pointer in the current web page, including a set of components in the current web page traversed with the virtual pointer, and a web page visited following the movement.

2. The method of claim 1, further comprising:

receiving, by the client device, a request from the user for the predicted web page;

determining whether a web page cache of the multi-level caching structure includes one or more files representing the predicted web page; and loading the one or more files from the web page cache into the web browser of the client device in response to determining that the web page cache includes the one or more files representing the predicted web page.

3. The method of claim 2, wherein the multi-level caching structure includes a web page cache and a metadata and content cache, and wherein in response to determining that the web page cache does not include the one or more files representing the predicted web page, the method further comprises:

generating, by the client device, the one or more files representing the predicted web page based on the metadata and content data cached in the metadata and content cache;

caching, by the client device, the one or more files in the web page cache; and loading, by the web browser of the client device, the one or more files from the web page cache.

4. The method of claim 3, wherein the metadata and content cache is associated with a first time-to-live and the web page cache is associated with a second time-to-live.

5. The method of claim 4, wherein the first time-to-live is shorter than the second time-to-live.

6. The method of claim 3, wherein the one or more files include one or more Hypertext Markup Language (HTML) files.

7. The method of claim 1, wherein the metadata represents a layout of one or more components in the predicted web page and the content data represents record data for presentation in the one or more components.

8. The method of claim 1, wherein the usage patterns further include one or more of historic click interactions in the current web page and historic navigation patterns from the current web page to one or more other web pages, including the predicted web page.

9. The method of claim 1, further comprising:

determining an expected time of on-demand loading of the predicted web page from the web server;

determining an expected time for loading the predicted web page when cached in the multi-level caching structure;

determining to not prefetch the predicted web page when the difference between the expected time of on-demand loading of the predicted web page from the web server and the expected time for loading the predicted web page when cached in the multi-level caching structure is lower than a threshold value.

10. A non-transitory machine-readable medium that stores instructions, which when executed by an electronic device, cause the electronic device to:

load a current web page of a web application in a web browser;

determine a predicted web page based on the current web page and usage patterns of a user of the web browser, wherein the predicted web page is a web page the user is predicted to navigate to from the current web page;

prefetch metadata and content data describing the predicted web page from a web server prior to the user requesting the predicted web page; and cache the metadata and content data describing the predicted web page in a multi-level caching structure.

11. The non-transitory machine-readable medium of claim 10, wherein the instructions further cause the electronic device to:

receive a request from the user for the predicted web page;

determine whether a web page cache of the multi-level caching structure includes one or more files representing the predicted web page; and load the one or more files from the web page cache into the web browser in response to determining that the web page cache includes the one or more files representing the predicted web page.

12. The non-transitory machine-readable medium of claim 11, wherein the multi-level caching structure includes a web page cache and a metadata and content cache, and wherein in response to determining that the web page cache does not include the one or more files representing the predicted web page, the instructions further cause the electronic device to:

generate the one or more files representing the predicted web page based on the metadata and content data cached in the metadata and content cache;

cache the one or more files in the web page cache; and load, in the web browser, the one or more files from the web page cache.

13. The non-transitory machine-readable medium of claim 12, wherein the metadata and content cache is associated with a first time-to-live and the web page cache is associated with a second time-to-live.

14. The non-transitory machine-readable medium of claim 13, wherein the first time-to-live is shorter than the second time-to-live.

15. The non-transitory machine-readable medium of claim 12, wherein the one or more files include one or more Hypertext Markup Language (HTML) files.

16. The non-transitory machine-readable medium of claim 10, wherein the metadata represents a layout of one or more components in the predicted web page and the content data represents record data for presentation in the one or more components.

17. The non-transitory machine-readable medium of claim 10, wherein the usage patterns further include one or more of historic click interactions in the current web page and historic navigation patterns from the current web page to one or more other web pages, including the predicted web page.

18. The non-transitory machine-readable medium of claim 10, wherein the determining a predicted web page is further based on performance metrics associated with prefetching the predicted web page and loading the predicted web page on-demand.

19. An electronic device for intelligently prefetching a web page of a web application for a user, the electronic device comprising:
   a processor; and
   a memory unit storing instructions, which when executed by the processor cause the electronic device to:
      load a current web page of the web application; and
      determine a predicted web page based on the current web page and usage patterns of the user, wherein the predicted web page is a web page the user is predicted to navigate to from the current web page, prefetch metadata and content data describing the predicted web page from a web server prior to the user requesting the predicted web page, and cache the metadata and content data describing the predicted web page in a multi-level caching structure.

20. The electronic device of claim 19, wherein the instructions when executed by the processor further cause the electronic device to:
   receive a request from the user for the predicted web page;
   determine whether a web page cache of the multi-level caching structure includes one or more files representing the predicted web page; and
   load the one or more files from the web page cache into the web browser of the client device in response to determining that the web page cache includes the one or more files representing the predicted web page.

21. The method of claim 1, wherein determining the predicted web page includes determining the metadata that describes a layout of a set of components presented in the predicted web page and the content data that includes a set of records associated with the user to be displayed in the set of components, and
   wherein the set of records are records most commonly viewed by the user with the predicted web page.

* * * * *